(12) United States Patent
Crafts

(10) Patent No.: US 6,694,076 B2
(45) Date of Patent: Feb. 17, 2004

(54) METHOD FOR CENTERING A CORE OF A WAVEGUIDE AMPLIFIER

(75) Inventor: Douglas E. Crafts, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 356 days.

(21) Appl. No.: 09/822,380

(22) Filed: Mar. 30, 2001

(65) Prior Publication Data

US 2002/0141728 A1 Oct. 3, 2002

(51) Int. Cl.⁷ .............................................. G02B 6/26
(52) U.S. Cl. ........................... 385/47; 385/85; 65/377
(58) Field of Search ......................... 385/147, 85, 90, 385/91; 65/382, 377

(56) References Cited

U.S. PATENT DOCUMENTS 4,763,980 A * 8/1988 Gerber et al. ................. 385/85
6,467,310 B2 * 10/2002 Terashima et al. ............ 65/382

\* cited by examiner

*Primary Examiner*—Walter E. Snow
(74) *Attorney, Agent, or Firm*—Blakely, Sokoloff, Taylor & Zafman LLP

(57) ABSTRACT

An apparatus and a method for centering a core of a waveguide amplifier. One embodiment of the invention comprises axially rotating a waveguide which has a core, shining a light through a light transmission pathway in the core of the waveguide, and shaping an outer surface of the waveguide in a predetermined pattern with respect to the light transmission pathway.

17 Claims, 4 Drawing Sheets

METHOD FOR CENTERING A CORE OF A WAVEGUIDE AMPLIFIER

FIELD OF THE INVENTION

The present invention relates to fiber optic light transmission. In particular, the present invention relates to centering a core of a waveguide amplifier.

BACKGROUND

Optical fibers are a medium through which light signals can travel. Light signals can travel through optical fibers over long distances. However, as the distance increases, the light signal begins to experience a loss in optical power and intensity. To compensate for this loss, the diminished light signal can be amplified by a waveguide amplifier. The waveguide amplifier supplies energy to the light signal, increasing the optical power and intensity of the light signal. A second optical fiber positioned in alignment with the waveguide amplifier can then receive and transmit the reenergized light signal.

In order for the light amplification to be successful, a light transmission pathway in the optical fiber containing the diminished light (an input optical fiber) should be aligned with a light transmission pathway in a core of the waveguide amplifier. In turn, the light transmission pathway in the core of the waveguide amplifier should be aligned with a light transmission pathway in an optical fiber receiving the amplified light (an output optical fiber), forming a continuous light transmission pathway from the input optical fiber to the waveguide amplifier to the output optical fiber.

Typically, the input optical fiber, the waveguide amplifier and the output optical fiber are each mounted separately to a mounting base. A problem with this technique is that a movement by any of the three components can cause the light signal to be misaligned with the other components, thus diminishing the light signal or cutting off the light signal pathway.

The technique of mounting the three components separately is necessitated by the fact that the light transmission pathway in the core of the waveguide amplifier of the prior art is typically not centered within the waveguide amplifier. As a result, the input optical fiber is mounted independently from the waveguide amplifier so that the input optical fiber can be adjusted to align the light transmission pathway in the input optical fiber with the off-centered light transmission pathway in the core of the waveguide amplifier. In addition, the output optical fiber is mounted independently from the waveguide amplifier so that the output optical fiber can be adjusted to align the light transmission pathway in the output optical fiber with the off-centered light transmission pathway in the core of the waveguide amplifier.

BRIEF DESCRIPTION OF THE DRAWINGS

The present invention is illustrated by way of example and is not limited by the accompanying figures in which.

DETAILED DESCRIPTION OF THE INVENTION

Figure 1A:
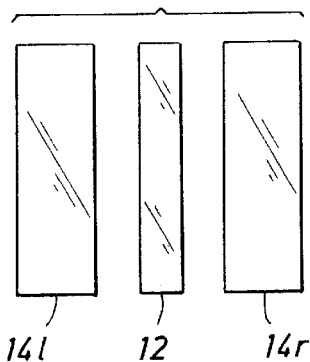
FIG. 1A shows a side view of polished glass plates used in a fabrication of a waveguide amplifier known in the art.
Figure 1B:
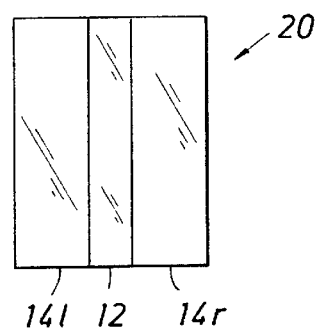
FIG. 1B shows a side view of the polished glass plates of FIG. 1A bonded together.
Figure 1C:
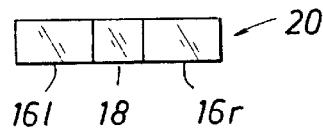
FIG. 1C shows a side view of the bonded glass plates of FIG. 1B reduced to a smaller vertical dimension.
Figure 1D:
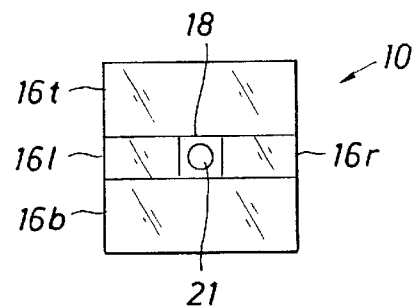
FIG. 1D shows a side view of an additional polished glass plate bonded, as illustrated, to a top surface and a bottom surface of the bonded glass plates of FIG. 1C, forming a rectangular waveguide amplifier.

The description discloses an apparatus and a method for centering a core of a waveguide amplifier. The following detailed description contains numerous specific details in order to provide a more thorough understanding of the present invention. However, it will be apparent to those skilled in the art to which this invention pertains that the present invention may be practiced without these specific details. In other instances, well-known devices, methods, procedures, and individual components have not been described in detail in order to avoid obscuring the present invention.

FIGS. 1A–1D show a fabrication of a waveguide, such as a waveguide amplifier. One waveguide amplifier fabrication technique known in the art begins by polishing plates of glass 14*l*, 12, and 14*r* to a specific thickness. The plates of glass 14*l*, 12, and 14*r* can then be bonded together, for example by using an ultraviolet (UV) bonding adhesive as known in the art. After bonding, the bonded plate assembly 20 may generally be reduced to a smaller vertical dimension, wherein the bonded plate assembly 20 has a core 18 with an encapsulating material 16*l* and 16*r* bonded to each side of the core 18. Additional polished glass plates, encapsulating materials 16*t* and 16*b*, can then be bonded to a top surface and a bottom surface of the bonded plate assembly 20, respectively, forming a waveguide amplifier 10. In this arrangement, the waveguide amplifier 10 comprises the core 18 and the encapsulating materials 16*l*, 16*r*, 16*t* and 16*b* (collectively referred to as an encapsulating material 16).

The waveguide amplifier 10 is used to amplify a diminishing input light signal (not shown). In order for the waveguide amplifier 10 to amplify the input light signal, the input light signal should be aligned with a light transmission pathway 21 in the core 18 of the waveguide amplifier 10, the light transmission pathway 21 being a pathway through which the input light signal travels as it is being amplified. The input light signal emerges from the waveguide amplifier 10 with increased optical power and intensity. For the amplified light signal to continue to travel, the waveguide amplifier 10 is aligned with an outgoing optical fiber or other waveguide (not shown).

In order to facilitate these alignments, according to current state-of-the art technology, the light transmission pathway 21 should be centered with respect to an outer surface of the waveguide amplifier 10 to a tolerance in the approximate range of plus or minus 1 micron. Using the method of the prior art, it is difficult to center the light transmission pathway 21 with respect to the outer surface of the waveguide amplifier 10 to this tolerance. This is generally due to the to the stack up tolerancing errors and the level of precision associated with fabricating the waveguide amplifier 10 according to the prior art. The prior art technique utilizes polishing and bonding of glass plates to form the waveguide amplifier 10. Modern techniques for polishing and bonding glass plates have not reached the level of precision to accommodate a tolerance of plus or minus one micron.

Figure 2A:
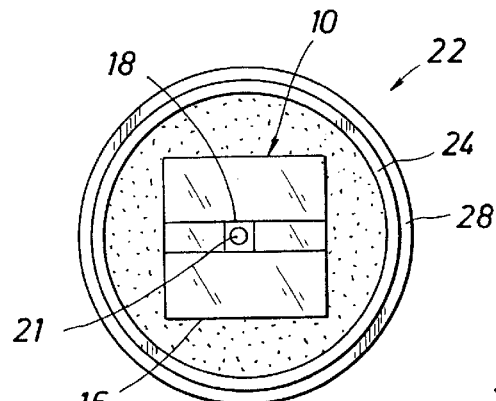
FIG. 2A shows a side view of the waveguide amplifier of FIG. 1D, showing the waveguide amplifier in a mandrel assembly according to an embodiment of the invention.
Figure 2B:
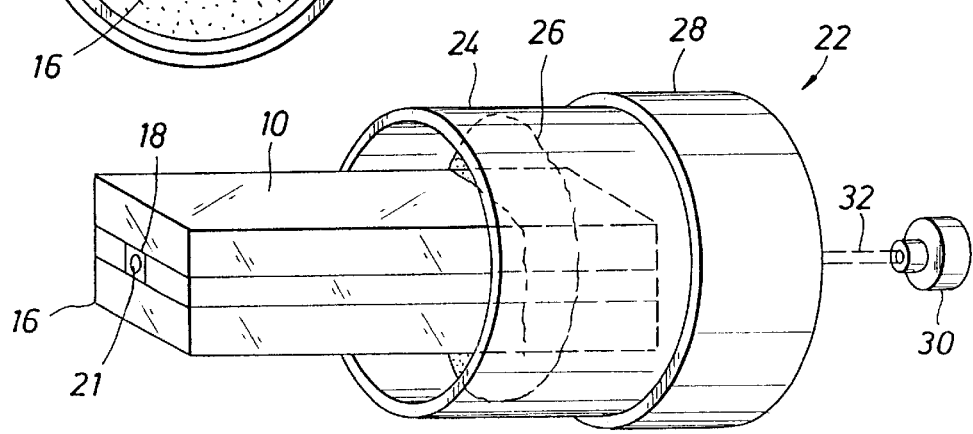
FIG. 2B shows an isometric view of the waveguide amplifier and mandrel assembly of FIG. 2A.

FIGS. 2A and 2B show an assembly 22 for forming a waveguide, such as waveguide amplifier 10, wherein the light transmission pathway 21 in the core 18 of the waveguide amplifier 10 is centered with respect to an outer surface of the waveguide amplifier 10. One technique for producing such a waveguide amplifier involves placing the waveguide amplifier 10 in a mandrel 24, such as a hollow-tube mandrel. In one embodiment, the core 18 of the waveguide amplifier 10 is comprised of an erbium-doped phosphate glass and the encapsulating material 16 is comprised of a silica glass. Once placed in the mandrel 24, one end of the waveguide amplifier 10 is coupled to the mandrel 24 using a thermoplastic material 26, typically a hard wax such as lens grinder's wax. The mandrel 24, in turn, is coupled to a rotating spindle 28. A light source 30, adjacent to the spindle 28, shines a light beam 32 through the spindle 28 and mandrel 24 and into the core 18 of the waveguide amplifier 10, the core 18 containing the light transmission pathway 21. In one embodiment the light beam 32 is a UV light beam. The light beam 32 travels through the light transmission pathway 21, which is typically circular. With the light beam 32 shining through the light transmission pathway 21, the spindle 28 is rotated to determine if the light transmission pathway 21 is concentric with the mandrel 24.

If the light transmission pathway 21 is eccentric with the mandrel 24, for instance if the center of the light transmission pathway 21 is 10 microns from the center axis of the mandrel 24, then rotating the spindle 28 will cause the light beam 32 to trace a circle having a radius of 10 microns. However, if the light transmission pathway 21 is concentric with the mandrel 24, then rotating the spindle 28 will cause the light beam 32 to rotate only about its own axis, looking like a single point rather than a circle.

FIG. 2A illustrates this point. FIG. 2A has been intentionally drawn to show the light transmission pathway 21 eccentric to the center of the mandrel 24. When viewing the light transmission pathway 21 from the perspective of FIG. 2A, rotating the spindle 28 about its center axis will cause the light beam 32 to trace the outline of a circle having a radius equal to the distance between the center of the light transmission pathway 21 and the center of the mandrel 24. If the light transmission pathway 21 were concentric with the mandrel 24, the light beam 32 would look like a single point rather than a circle.

If rotating the spindle 28 causes the light beam 32 to trace the outline of a circle, the thermoplastic material 26, which couples one end of the waveguide amplifier 10 to the mandrel 24, can be heated. Heating the thermoplastic material 26 softens the material, allowing the waveguide amplifier 10 to be repositioned to move the light transmission pathway 21 closer to the center axis of the mandrel 24. After the thermoplastic material 26 resolidifies, the spindle 28 can be rotated again to see if the light beam 32 traces the outline of a circle. This process can be repeated until the light beam 32 looks like a point rather than a circle when the spindle is rotated.

Figure 3A:
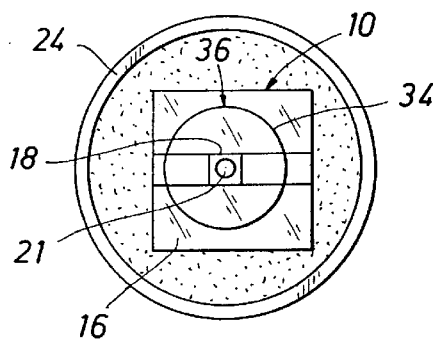
FIG. 3A shows a side view of the waveguide amplifier of FIG. 2B after a portion of the waveguide amplifier has been shaped such that a light transmission pathway within the waveguide amplifier is centered with respect to an outer surface of the waveguide amplifier.
Figure 3B:
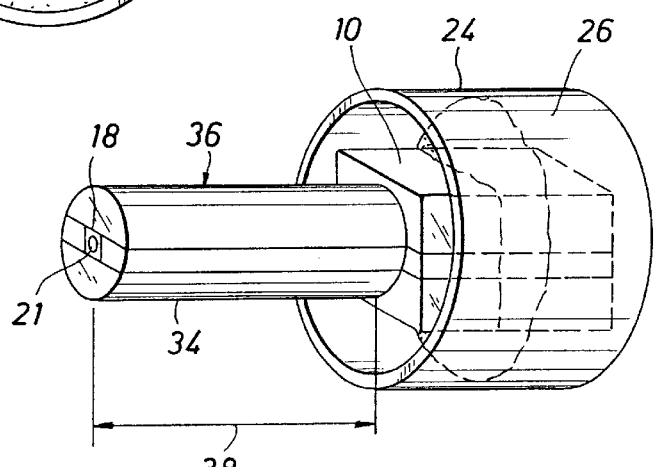
FIG. 3B shows an isometric view of the waveguide amplifier and mandrel assembly of FIG. 3A.

FIGS. 3A and 3B show a shaping of the waveguide amplifier 10. When the light transmission pathway 21 has been positioned concentric with the mandrel 24, one technique for centering the light transmission pathway 21 with respect to an outer surface of the waveguide amplifier 10 involves placing the waveguide amplifier 10 and the mandrel 24 in a radial grinder (not shown). FIG. 3A shows a waveguide amplifier 10 wherein the light transmission pathway 21 is concentric with the mandrel 24 but not centered with respect to the outer surface of the waveguide amplifier 10. When the waveguide amplifier 10 is configured in this manner, the grinder removes portions of the waveguide amplifier 10 to produce a cylindrical portion 34 of the waveguide amplifier 10 having a circular outer surface 36, wherein the light transmission pathway 21 is concentric with the outer surface 36 of the cylindrical portion 34 of the waveguide amplifier 10.

In one embodiment, a portion 38 of the waveguide amplifier 10 extends beyond the mandrel 24. In this embodiment, when the light transmission pathway 21 has been positioned concentric with the mandrel 24, the waveguide amplifier 10 and the mandrel 24 are placed in a radial grinder (not shown). The grinder removes material from at least part of the portion 38 of the waveguide amplifier 10 that extends beyond the mandrel 24, to produce the cylindrical portion 34 of the waveguide amplifier 10, wherein the light transmission pathway 21 is concentric with the outer surface 36 of the cylindrical portion 34 of the waveguide amplifier 10. In this embodiment, when the cylindrical portion 34 of the waveguide amplifier 10 is formed, the cylindrical portion 34 may be removed from a remainder of the waveguide amplifier 10, to produce a cylindrical waveguide amplifier 42 wherein the light transmission pathway 21 is concentric with the outer surface 36 of the cylindrical waveguide amplifier 42 (shown in FIG. 4). Although a cylindrical waveguide amplifier 42 has been described other waveguide amplifier shapes are contemplated by the present invention.

Figure 4:
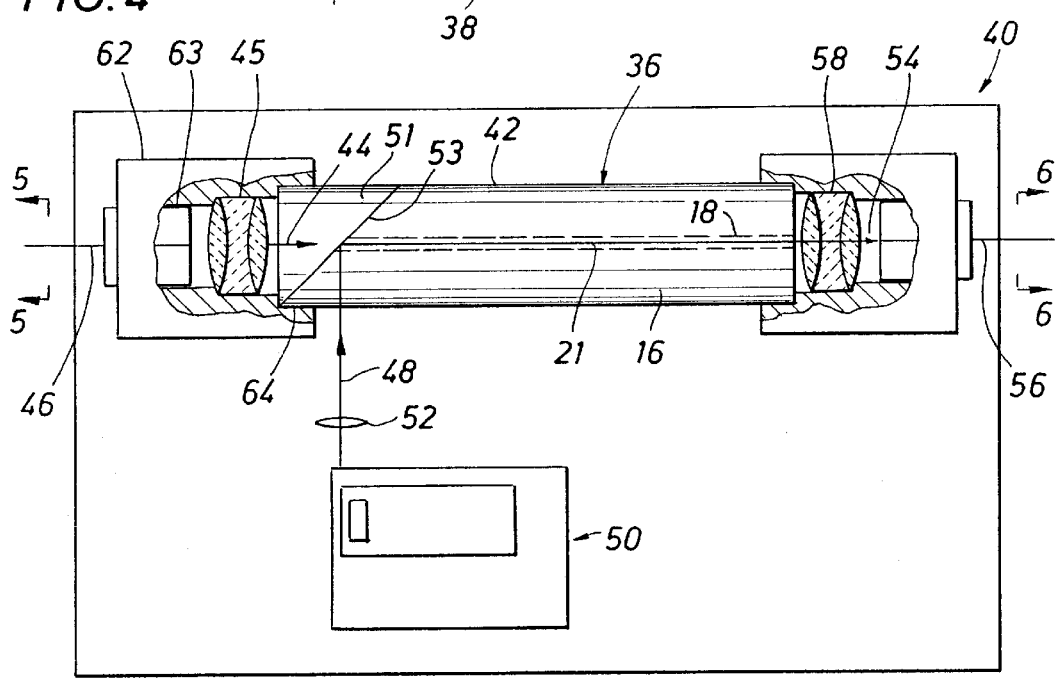
FIG. 4 shows a top view of an optical amplifier system according to an embodiment of the invention.

FIG. 4 shows an optical amplifier system 40 comprising the cylindrical waveguide amplifier 42 prepared as described above with reference to FIGS. 2A–3B. In one embodiment, the core 18 of the cylindrical waveguide amplifier 42 is comprised of an erbium-doped phosphate glass and the encapsulating material 16 is comprised of a silica glass.

Figure 5:
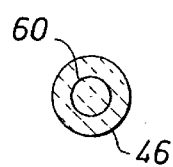
FIG. 5 shows a cross sectional view of an input optical fiber from the optical amplifier system of FIG. 4.
Figure 6:
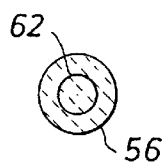
FIG. 6 shows a cross sectional view of an output optical fiber from the optical amplifier system of FIG. 4.

FIGS. 4–6 show an input light signal 44 emanating from an input optical fiber 46. As the distance traveled through the input optical fiber 46 by the input light signal 44 increases, the input light signal 44 begins to experience losses in optical power and intensity. To compensate for these losses, the input light signal 44 can be focused by a collimating lens 45 to direct the input light signal 44 into the light transmission pathway 21 in the core 18 of a waveguide, such as the cylindrical waveguide amplifier 42.

In one embodiment, a prism 51 is attached to the cylindrical waveguide amplifier 42. In this embodiment, the prism 51 has a surface that faces the input light signal 44 and an underside surface 53 that faces an amplified beam 48, for example a laser beam, emanating from a beam source 50, for example a laser diode pump. The surface of the prism 51 that faces the input light signal 44 may be coated with an anti-reflective coating. The anti-reflective coating is chosen such that it allows the wavelength of light of the input light signal 44 to pass through its surface with only a minimal loss in optical power and intensity. The underside surface 53 of the prism 51 may be coated with a reflective coating or a filter coating. In one example, a filter coating is chosen such that it allows the wavelength of light of the input light signal 44 to pass through its surface and enter the light transmission pathway 21 in the core 18 of the cylindrical waveguide amplifier 42, and reflects the wavelength of light of the beam 48 off of the underside surface 53 of the prism 51 and into the light transmission pathway 21 in the core 18 of the cylindrical waveguide amplifier 42 (the beam 48 emanates from the beam source 50 into a focusing lens 52 which directs the beam 48 onto the underside surface 53 of the prism 51). As a result, the beam 48 engages the input light signal 44 in the light transmission pathway 21 of the cylindrical waveguide amplifier 42 exciting atoms, and increasing the optical power and intensity of the input light signal 44. Thus, the light signal that emerges from the cylindrical waveguide amplifier 42, an output light signal 54, has increased optical power and intensity, and may be directed to an output optical fiber 56, or other optical component by a collimating lens 58 that focuses the output light signal 54 into a light transmission pathway 62 in the output optical fiber 56.

In order for this light amplification to be successful, a light transmission pathway 60 in the input optical fiber 46 (as shown in FIG. 5) should be aligned with the light transmission pathway 21 in the core 18 of the cylindrical waveguide amplifier 42, and, in turn, the light transmission pathway 21 in the core 18 of the cylindrical waveguide amplifier 42 should be aligned with the light transmission pathway 62 in the output optical fiber 56 (as shown in FIG. 6), thus forming a continuous pathway through which a light signal can travel.

As previously discussed, many of the waveguide amplifiers of the prior art have light transmission pathways that are not centered within the waveguide amplifier. As a result, the input optical fiber are typically mounted independently of the waveguide amplifier so that the input optical fiber can be adjusted until it is aligned with the light transmission pathway of the waveguide amplifier. Similarly, the output optical fiber is typically mounted independently of the waveguide amplifier so that the output optical fiber can be adjusted until it is aligned with the light transmission pathway of the waveguide amplifier. A disadvantage of this approach is that a movement by any of the three of these components can cause the light signal to be misaligned with the other components, thus diminishing the light signal or cutting off the light signal pathway.

Using the technique of the current invention, the input and output fibers 46 and 56 respectively, can be mounted directly to the cylindrical waveguide amplifier 42. In one embodiment, an optical fiber capillary 63 encompasses a portion of the input optical fiber 46. The optical fiber capillary 63 protects an end of the input optical fiber 46 and provides an area for attachment to a first mounting assembly, such as a collimator tube 62. The collimator tube 62 can house the collimator lens 45 and collimate the incoming light signal 44 with the collimator lens 45. The collimator tube 62 can also be used to mount the input optical fiber 46 directly to the cylindrical waveguide amplifier 42.

In one embodiment, the collimator tube 62 has an opening 64 which matches the outer surface 36 of the cylindrical waveguide amplifier 42. In one embodiment, the opening 64 is a circular bore or through-hole dimensioned to snap fit the collimator tube 62 onto the outer surface 36 of the cylindrical waveguide amplifier 42. Since the light transmission pathway 21 in the core 18 of the cylindrical waveguide amplifier 42 is concentric with the outer surface 36 of the cylindrical waveguide amplifier 42, positioning the light transmission pathway 60 of the input optical fiber 46 concentric with the opening 64 in the collimator tube 62 aligns the light transmission pathway 60 in the input optical fiber 46 with the light transmission pathway 21 in the core 18 of the cylindrical waveguide amplifier 42. As a result, when the collimator tube 62 is secured to the cylindrical waveguide amplifier 42 no further adjusting is required to align the light transmission pathway 60 of the input optical fiber 46 with the light transmission pathway 21 in the core 18 of the cylindrical waveguide amplifier 42.

Positioning the input optical fiber 46 concentric with the opening 64 in the collimator tube 62 can be accomplished by a variety of methods including, but not limited to: using a high precision lathe or drill to center a through-hole in the optical fiber capillary 63; inserting the input optical fiber 46 in the centered through-hole of the optical fiber capillary 63; using a high precision lathe or drill to center a through-hole in the collimator tube 62; inserting the collimating lens 45 and the optical fiber capillary 63 in the centered through-hole in the collimator tube 62; using a high precision lathe or drill to center a bore concentric with the centered through-hole in the collimating tube 62, the bore forming the opening 64 in the collimator tube 62.

Although the above discussion focuses on mounting the input optical fiber 46 to one end of the cylindrical waveguide amplifier 42, the same technique can be used to mount the output optical fiber 56 or other waveguide to an opposite end of the cylindrical waveguide amplifier 42.

Figure 7:
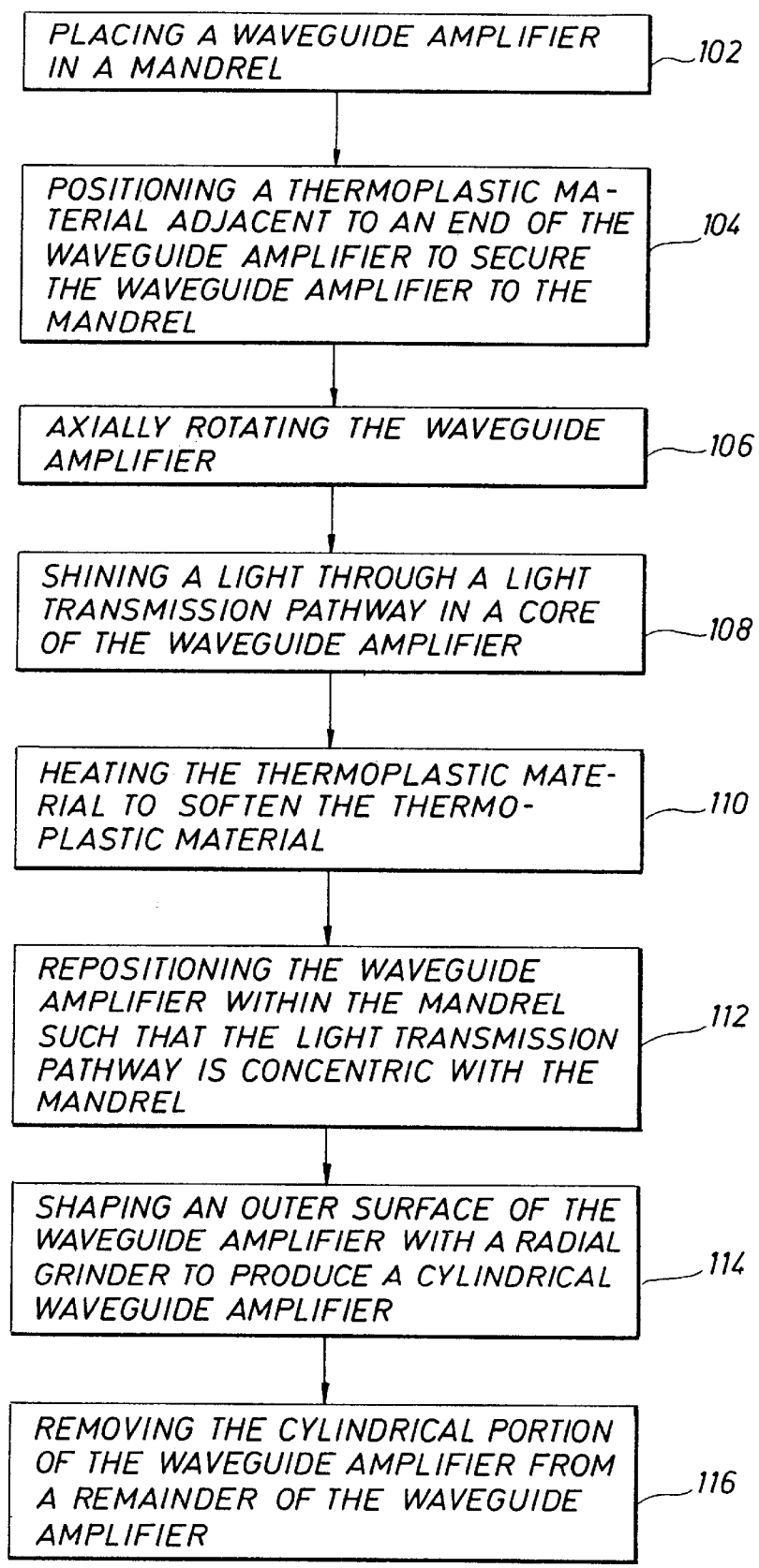
FIG. 7 shows a flow chart for producing a cylindrical waveguide amplifier.

FIG. 7 shows a flow chart for producing the cylindrical waveguide amplifier 42, wherein the light transmission pathway 21 in the core 18 of the cylindrical waveguide amplifier 42 is concentric with the outer surface 36 of the cylindrical waveguide amplifier 42. Block 102 shows a placing of the waveguide amplifier 10 in the mandrel 24, such as a hollow-tube mandrel. In one embodiment, the core 18 of the waveguide amplifier 10 is comprised of an erbium-doped phosphate glass and the encapsulating material 16 is comprised of a silica glass.

Block 104 shows a positioning of the thermoplastic material 26 adjacent to an end of the waveguide amplifier 10. When the waveguide amplifier 10 is placed inside the mandrel 24, in one example, a hard wax such as lens grinder's wax can be positioned adjacent to an end of the waveguide amplifier 10 to couple the waveguide amplifier 10 to the mandrel 24. The mandrel 24, in turn, is coupled to a rotating spindle 28, such that the waveguide amplifier 10 may be axially rotated, as shown in block 106.

Block 108 shows a shining of the light beam 32 through the light transmission pathway 21 in the core 18 of the waveguide amplifier 10. As the rotating spindle 28 rotates the waveguide amplifier 10, the light source 30, positioned adjacent to the spindle 28, shines the light beam 32 through the spindle 28 and the mandrel 24 and into the core 18 of the waveguide amplifier 10, the core 18 containing the light transmission pathway 21. In one embodiment the light beam 32 is a UV light beam. The light beam 32 travels through the light transmission pathway 21, which is typically circular. With the light beam 32 shining through the light transmission pathway 21, the spindle 28 is rotated to determine if the light transmission pathway 21 is concentric with the mandrel 24. If the light transmission pathway 21 is eccentric with the mandrel 24, for instance if the center of the light transmission pathway 21 is 10 microns from the center axis of the mandrel 24, then rotating the spindle 28 will cause the light beam 32 to trace a circle having a radius of 10 microns. However, if the light transmission pathway 21 is concentric with the mandrel 24, then rotating the spindle 28 will cause the light beam 32 to rotate only about its own axis, looking like a single point rather than a circle.

FIG. 2A illustrates this point. FIG. 2A has been intentionally drawn to show the light transmission pathway 21 eccentric to the center of the mandrel 24. When viewing the light transmission pathway 21 from the perspective of FIG. 2A, rotating the spindle 28 about its center axis will cause the light beam 32 to trace the outline of a circle having a radius equal to the distance between the center of the light transmission pathway 21 and the center of the mandrel 24. If the light transmission pathway 21 were concentric with the mandrel 24, the light beam 32 would look like a single point rather than a circle.

When rotating the spindle 28 causes the light beam 32 to trace the outline of a circle, the thermoplastic material 26, which couples one end of the waveguide amplifier 10 to the mandrel 24, can be heated, as shown in block 110, to soften the thermoplastic material 26. Softening the thermoplastic material 26 allows the waveguide amplifier 10 to be repositioned within the mandrel 24, as shown in block 112, to move the light transmission pathway 21 closer to the center axis of the mandrel 24. After the thermoplastic material 26 resolidifies, the spindle 28 can be rotated again to determine if the light beam 32 traces the outline of a circle. This process can be repeated until the light transmission pathway 21 in the core 18 of the waveguide amplifier 10 is concentric with the mandrel 24, i.e. when rotating the spindle 28 causes the light beam 32, which shines through the light transmission pathway 21, to look like a point rather than a circle.

Block 114 shows a shaping of the outer surface 36 of the waveguide amplifier 10 with a radial grinder to produce the cylindrical waveguide amplifier 42. When the light transmission pathway 21 has been positioned concentric with the mandrel 24, one technique for centering the light transmission pathway 21 with respect to the outer surface 36 of the waveguide amplifier 10 involves placing the waveguide amplifier 10 and the mandrel 24 in a radial grinder (not shown). FIG. 3A shows the waveguide amplifier 10 wherein the light transmission pathway 21 is concentric with the mandrel 24 but not centered with respect to the outer surface 36 of the waveguide amplifier 10. When the waveguide amplifier 10 is configured in this manner, the radial grinder removes portions of the waveguide amplifier 10 to produce a cylindrical portion 34 of the waveguide amplifier 10 wherein the outer surface 36 is circular and the light transmission pathway 21 is concentric with the outer surface 36 of the cylindrical portion 34 of the waveguide amplifier 10.

In one embodiment, the portion 38 of the waveguide amplifier 10 extends beyond the mandrel 24. In this embodiment, when the light transmission pathway 21 has been positioned concentric with the mandrel 24, the waveguide amplifier 10 and the mandrel 24 are placed in a radial grinder (not shown). The grinder removes material from at least part of the portion 38 of the waveguide amplifier 10 that extends beyond the mandrel 24, to produce the cylindrical portion 34 of the waveguide amplifier 10, wherein the light transmission pathway 21 is concentric with the outer surface 36 of the cylindrical portion 34 of the waveguide amplifier 10. In this embodiment, when the cylindrical portion 34 of the waveguide amplifier 10 is formed, the cylindrical portion 34 may be removed from a remainder of the waveguide amplifier 10, as shown in block 116, to produce a cylindrical waveguide amplifier 42 wherein the light transmission pathway 21 is concentric with the outer surface 36 of the cylindrical waveguide amplifier 42. Although a cylindrical waveguide amplifier 42 has been described other waveguide amplifier shapes are contemplated by the present invention.

Figure 8:
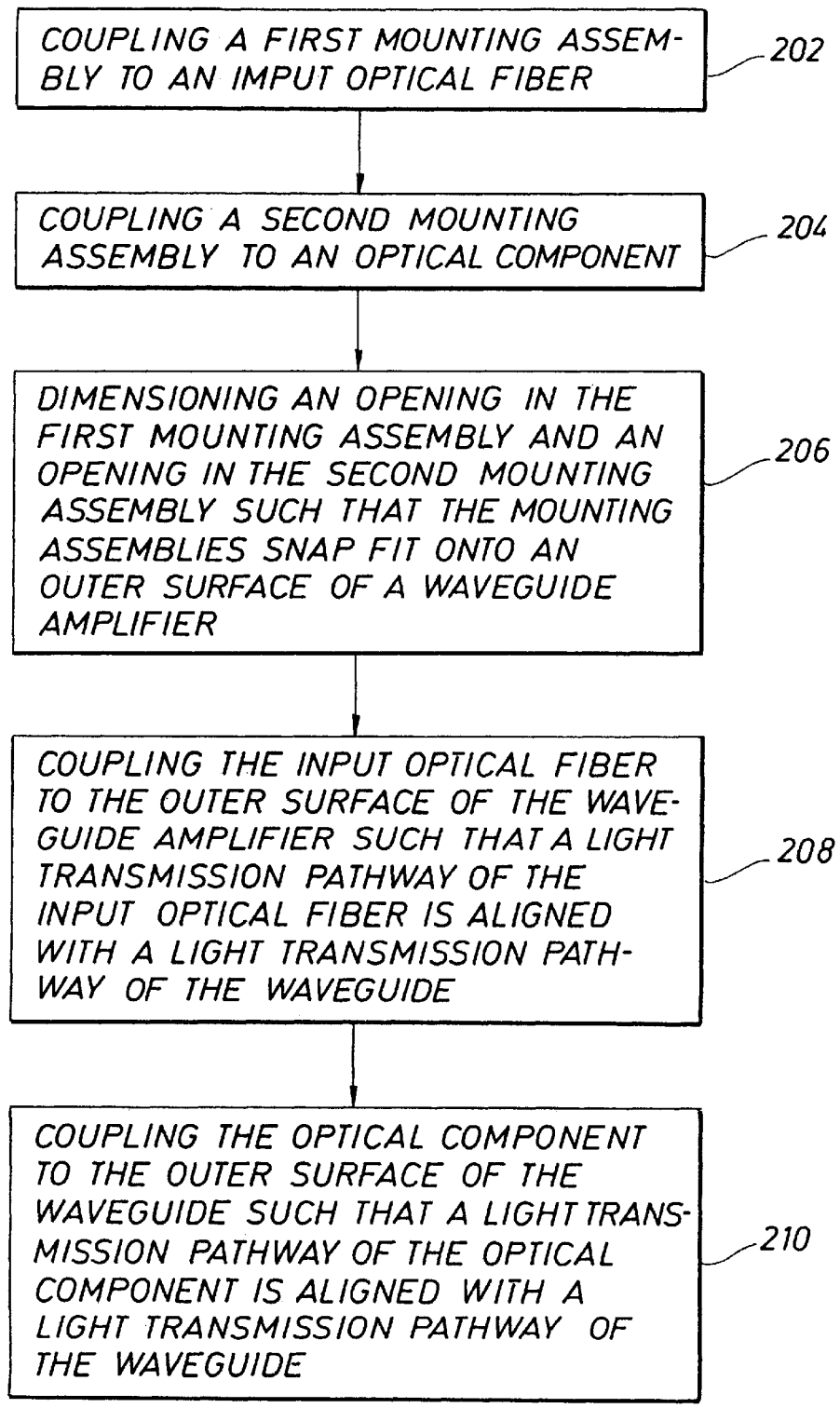
FIG. 8 shows a flow chart for coupling an input optical fiber and an optical component to an outer surface of a waveguide amplifier.

FIG. 8 shows a flow chart for coupling the input optical fiber 46 and an optical component, such as the output optical component 56 to the outer surface 36 of a waveguide amplifier, such as the cylindrical waveguide amplifier 42. Block 202 shows a coupling of the first mounting assembly, such as the collimator tube 62, to the input optical fiber 46. In one embodiment, a portion of the input optical fiber 46 is housed in the optical fiber capillary 63. The optical fiber capillary 63 protects an end of the input optical fiber 46 and provides an area for attachment to the collimator tube 62. The collimator tube 62 can house the collimator lens 45 and collimate the incoming light signal 44 with the collimator lens 45. In one embodiment, the input optical fiber 46 is coupled concentric with the opening 64 in the collimator tube 62. This coupling can be accomplished by a variety of methods including, but not limited to: using a high precision lathe or drill to center a through-hole in the optical fiber capillary 63; inserting the input optical fiber 46 in the centered through-hole of the optical fiber capillary 63; using a high precision lathe or drill to center a through-hole in the collimator tube 62; inserting the collimating lens 45 and the optical fiber capillary 63 in the centered through-hole in the collimator tube 62; using a high precision lathe or drill to center a bore concentric with the centered through-hole in the collimating tube 62, the bore forming the opening 64 in the collimator tube 62. As a result, the input optical fiber 46 coupled within the collimator tube 62 and concentric with the opening 64.

Block 204 shows a coupling of a second mounting assembly, such as a collimator tube, to the optical component, such as the output optical fiber 56. The second mounting assembly can be coupled to the optical component using the same method as is described above for coupling the first mounting assembly 62 to the input optical fiber 46.

In one embodiment, the opening 64 is dimensioned to snap fit the collimator tube 62 onto the outer surface 36 at a first end of the cylindrical waveguide amplifier 42, as is shown in block 206. Similarly, the second mounting assembly can be made to snap fit onto the outer surface 36 at a second end of the cylindrical waveguide amplifier 42.

Since the light transmission pathway 21 in the core 18 of the cylindrical waveguide amplifier 42 is concentric with the outer surface 36 of the cylindrical waveguide amplifier 42, positioning the light transmission pathway 60 of the input optical fiber 46 concentric with the opening 64 in the collimator tube 62 aligns the light transmission pathway 60 in the input optical fiber 46 with the light transmission pathway 21 in the core 18 of the cylindrical waveguide amplifier 42 when the collimator tube 62 to mounted at the first end of the cylindrical waveguide amplifier 62, as is shown is block 208. Similarly, the light transmission pathway 62 of the output optical fiber 56 can be aligned with the light transmission pathway 21 in the cylindrical waveguide amplifier 62 when the second mounting assembly is mounted to the second end of the cylindrical waveguide amplifier 62, as is shown in stop 210.

Embodiments of the invention include an apparatus and a method for centering a core of a waveguide amplifier.

Embodiments include an apparatus and a method for producing a cylindrical waveguide amplifier having a light transmission pathway in a core of the cylindrical waveguide amplifier that is concentric with an outer surface of the cylindrical waveguide amplifier. Producing a waveguide amplifier with a light transmission pathway concentric with the outer surface of the waveguide amplifier allows an input and output optical fiber to be mounted directly to the waveguide amplifier, thereby allowing any or all of the three components (the input optical fiber, the output optical fiber or the waveguide amplifier) to be moved by outside forces such as vibration without misaligning the light transmission pathways of the three components.

Although specific embodiments, including specific parameters, methods, and materials have been described, various modifications to the disclosed embodiments will be apparent to one of ordinary skill in the art upon reading this disclosure. Therefore, it is to be understood that such embodiments are merely illustrative of and not restrictive on the broad invention and that this invention is not limited to the specific embodiments shown and described.

I claim:

1. A method comprising:
   axially rotating a waveguide which has a core;
   shining a light through a light transmission pathway in the core of the waveguide;
   adjusting a position of the light transmission pathway, wherein adjusting includes placing the waveguide in a mandrel; and
   shaping an outer surface of the waveguide in a predetermined pattern with respect to the adjusted light transmission pathway.

2. The method of claim 1 wherein the waveguide is a waveguide amplifier.

3. The method of claim 2 wherein adjusting includes positioning a thermoplastic material adjacent to an end of the waveguide amplifier to secure the waveguide amplifier to the mandrel.

4. The method of claim 3, wherein the shaping includes shaping the outer surface of the waveguide amplifier to produce a cylindrical waveguide amplifier wherein the light transmission pathway is concentric with an outer surface of the cylindrical waveguide amplifier.

5. The method of claim 4, wherein the thermoplastic material is a hard wax.

6. The method of claim 4, wherein positioning includes:
   heating the thermoplastic material to soften the thermoplastic material; and
   repositioning the waveguide amplifier within the mandrel such that the light transmission pathway is concentric with the mandrel.

7. The method of claim 1, wherein the light is an ultraviolet light.

8. The method of claim 2, wherein the core is comprised of erbium-doped phosphate glass and a material encapsulating the core is comprised of silica glass.

9. The method of claim 3, wherein the shaping comprises utilizing a radial grinder to shape a portion of the waveguide amplifier that extends beyond the mandrel to produce a cylindrically shaped portion of the waveguide amplifier, wherein the light transmission pathway is concentric with an outer surface of the cylindrical portion of the waveguide amplifier.

10. The method of claim 9, further comprising removing the cylindrical portion of the waveguide amplifier from a remainder of the waveguide amplifier.

11. A method comprising:
    placing a waveguide which has a core in a mandrel;
    positioning a thermoplastic material adjacent to an end of the waveguide to secure the waveguide to the mandrel;
    shining a light through a light transmission pathway in the core of the waveguide;
    axially rotating the spindle to determine if the light transmission pathway is concentric with the mandrel;
    repositioning the waveguide within the mandrel such that the light transmission pathway is concentric with the mandrel; and
    shaping an outer surface of the waveguide in a predetermined pattern with respect to the light transmission pathway.

12. The method of claim 11, wherein the waveguide is a waveguide amplifier.

13. The method of claim 11, wherein:
    securing includes positioning a thermoplastic material adjacent to an end of the waveguide; and
    repositioning includes:
      heating the thermoplastic material to soften the thermoplastic material;
      moving the waveguide such that the light transmission pathway is concentric with the mandrel; and
      resolidifying the thermoplastic material.

14. The method of claim 11, wherein shaping the outer surface of the waveguide includes shaping the outer surface to produce a cylindrical waveguide amplifier wherein the light transmission pathway is concentric with an outer surface of the cylindrical waveguide amplifier.

15. The method of claim 11, wherein the core is comprised of erbium-doped phosphate glass and a material encapsulating the core is comprised of silica glass.

16. The method of claim 14, wherein the shaping comprises utilizing a radial grinder to shape a portion of the waveguide amplifier that extends beyond the mandrel to produce a cylindrical portion of the waveguide amplifier, wherein the light transmission pathway is concentric with an outer surface of the cylindrical portion of the waveguide amplifier.

17. The method of claim 16 further comprising removing the cylindrical portions of the waveguide amplifier from a remainder of the waveguide amplifier.

* * * * *